United States Patent [19]

Turner et al.

[11] Patent Number: 4,607,525
[45] Date of Patent: Aug. 26, 1986

[54] HEIGHT MEASURING SYSTEM

[75] Inventors: Michael D. Turner, San Jose; Jacques Roch, Mountain View, both of Calif.

[73] Assignee: General Signal Corporation, Stamford, Conn.

[21] Appl. No.: 659,210

[22] Filed: Oct. 9, 1984

[51] Int. Cl.⁴ .................. G01B 13/16; G01R 31/02
[52] U.S. Cl. ........................... 73/37.5; 73/37.6; 324/73 PC
[58] Field of Search ............... 73/37.5, 37.6; 324/158 F, 158 P, 73 PC

[56] References Cited

U.S. PATENT DOCUMENTS

| | | | |
|---|---|---|---|
| 3,210,987 | 10/1965 | Bruns | 73/37.6 |
| 3,213,670 | 10/1965 | MacGeorge | 73/37.6 |
| 3,729,966 | 5/1973 | Khoury et al. | 72/12 |
| 3,874,864 | 4/1975 | Peters et al. | 73/37.6 |
| 3,884,076 | 5/1975 | Studer | 324/226 |
| 3,996,517 | 12/1976 | Fergason et al. | 324/158 F |
| 4,144,536 | 3/1979 | Ardezzone et al. | 324/158 F |
| 4,158,171 | 6/1979 | Abbe et al. | 324/158 F |
| 4,179,919 | 12/1979 | McKechnie | 73/37.5 |
| 4,206,633 | 6/1980 | McKechnie et al. | 73/37.5 |
| 4,491,787 | 1/1985 | Akiyama et al. | 324/61 P |

FOREIGN PATENT DOCUMENTS

| | | | |
|---|---|---|---|
| 2425070 | 1/1980 | France | 324/158 F |
| 152408 | 11/1980 | Japan | 73/37.5 |

Primary Examiner—Stewart J. Levy
Assistant Examiner—Hezron E. Williams
Attorney, Agent, or Firm—Ronald Reichman; Thomas R. FitzGerald

[57] ABSTRACT

The invention of this disclosure is a profiling and testing system that uses an air probe to determine the contour of a wafer containing a plurality of dies so that an electrical sensor may automatically step from die to die and test the completed dies in the wafer.

11 Claims, 1 Drawing Figure

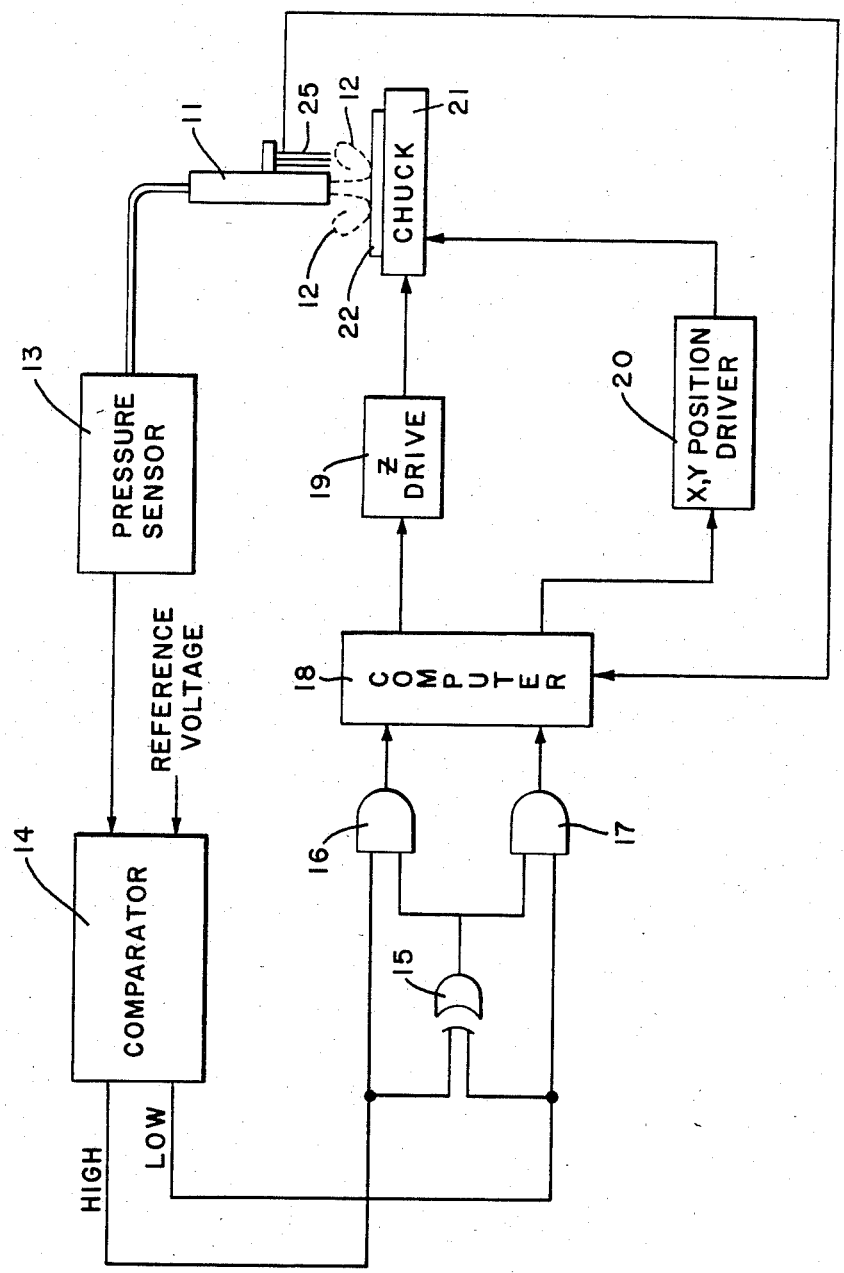

HEIGHT MEASURING SYSTEM

FIELD OF THE INVENTION

This invention relates to the manufacture of microelectronic circuits and more particularly to a method and apparatus for probing and testing microelectronic circuits.

DESCRIPTION OF THE PRIOR ART

The use of microelectronic circuits have greatly increase during the past decades a period of general economic inflation, while the costs of manufacturing microelectronic circuits have been decreasing. A microelectronic circuit is a complete electronic circuit contained on a single layer of silicon comprising transistors and perhaps diodes, resistors and capacitors, along with their interconnecting electrical connectors. Hundreds of microelectronic circuits or dies may be manufactured on a single wafer of silicon.

In order to reduce manufacturing costs, the prior art tested the dies to determine which dies are defective. The defective dies were marked with a dab of paint so that people would know not to continue processing these dies. The prior art utilized a plurality of probes which were positioned around a ring or probe card to perform the electronic tests. The ring or probe card was lowered so that the probes would be positioned over the input and output pads of individual dies. The probes must make good electrical contact with the pads in order to have an accurate electrical test. Often times the wafer may not be flat and there may be local variations in the surface geometry of the wafer so that when the probe was stepped from one die to the next die, the probe would not exert the same pressure on the dies' test pads and poor electrical contact was obtained resulting in erroneous test data. The prior art attempted to solve the foregoing problem by utilizing another probe, in conjunction with the prior probe. This additional probe had a small switch or contact on its side so that when the wafer was moved in the z direction the contact on the probe would determine when the wafer was at the proper height for electrical tests to be performed. One of the disadvantages of the prior art is that the contacts of the additional probe are very susceptible to contamination and oxidation thereby limiting the reliability of the entire probe system. Another disadvantage of the prior art is that the contact-type probe was delicate and was easily damaged. An additional disadvantage of the prior art was that painting the defective dies with a dab of paint sometimes damaged dies that were not defective. A further disadvantage of the prior art was that it was difficult to know if an incomplete or partial die was near the edge of the wafer. When this happened, electrical probes would be testing the die while other probes were hanging over the edges of the die resulting in time consuming electrical tests being performed on obviously defective dies.

SUMMARY OF THE INVENTION

This invention overcomes the disadvantages of the prior art by providing an improved probing system that is used to determine the height to test the dies on a wafer and determine the edge of the wafer so that time consuming electrical tests will not have to be performed on incomplete dies. Another advantage of this invention is that the aforementioned probing may be used in conjunction with a computer to determine the center of the wafer and the test points of the dies so that the testing sensor will be able to automatically step from die to die. The foregoing is possible because the location of the dies' test pads were calculated by the computer. A further advantage of this invention is that it is no longer necessary to mark defective dies with a dab of paint, since the computer can store the location of the defective die in its memory and the die may be automatically removed after the wafer is diced. The computer may also record the testing information pertaining to each die on many wafers. The aforementioned testing information may be analyzed to determine the large number of defective dies at specific wafer locations. If a large number of dies were defective at a particular wafer location, it would be advisable to check prior manufacturing steps and determine what is causing dies to fail at specific wafer locations. The apparatus of this invention achieves the foregoing by utilizing a probe that senses differences in air pressure between the die and probe to adjust the height of the chuck that is holding the wafer.

It is an object of this invention to provide a new and improved system and apparatus for testing dies on wafers.

It is another object of this invention to provide a new and improved system for determining the geometric profile of a wafer so that an electronic sensor may automatically move from the test pads on one die to the test pads on another die.

It is a further object of this invention to provide a new and improved system that automatically tests dies and records their test performance.

Further objects and advantages and this invention will become more apparent as the following description proceeds, which invention should be considered together with the accompanying drawing.

BRIEF DESCRIPTION OF THE DRAWINGS

The only FIGURE in this case is a diagram of the apparatus of this invention.

DESCRIPTION OF PREFERRED EMBODIMENT

Referring to the drawing in detail, the reference character 11 represents a probe that has a stream of air 12 that exits from one end of probe 11. The other end of probe 11 is coupled to pressure sensor or transducer 13. The output of pressure sensor 13 is coupled to one of the two inputs of comparator 14. The other input of comparator 14 is a calibration input that is adjusted to a specific voltage that represents a specified height of probe 11. Comparator 14 has two outputs. A high output and a low output. The high output is coupled to one of the two inputs of exclusive OR gate 15 and one of the two inputs of AND gate 16. While the low output of comparator 14 is coupled to one of the two inputs of exclusive OR gate 15 and one of the two inputs of AND gate 17. The output of gate 15 is coupled to the second input of AND gate 16 and the second input of AND gate 17. The output of AND gate 16 is coupled to the first input of computer 18 and the output of gate 17 is coupled to the second input of computer 18. Computer 18 has two outputs, the first output is coupled to the input of Z drive 19 and the second output is coupled to the input of X, Y position driver 20. The output of Z drive 19 is coupled to one of the inputs of chuck 21 and the output of driver 20 is coupled to one of the inputs of chuck 21. A wafer 22 having a plurality of dies (not shown) rests on chuck 21. Wafer 22 is usually circular and for purposes of this description, we will assume that wafer 22 is circularly shaped. A plurality of sensors 25 perform electrical tests on the dies that comprise wafer 22. Sensors 25 are attached to probe 11 and coupled to a tester (not shown) which sends test results to the memory of computer 18. The apparatus of this invention determined the positions of the aforementioned sensors relative to wafer 22 by having probe 11 direct a stream of air 12 at the dies that comprise wafer 22. Air stream 12 will have turbulent flow near wafer 22 and be reflected back toward probe 11. The aforementioned air stream will create a differential pressure. This differential pressure will be the difference between the pressure of air stream 12 and the ambient atmospheric pressure on the surface of wafer 22 with no air being emitted from probe 11. This differential pressure will be used to determine the height of electrical testing sensors 25. Sensor 13 produces an electrical output signal or output voltage that represents the differential pressure.

During the calibration of this system a reference voltage will be placed on the calibration input of comparator 14. The above-referenced voltage will be determined by placing a feeler gauge (not shown) between probe 11 and wafer 22. The thickness of the feeler gauge will depend upon the specified working distance of electrical testing sensors 25. If the testing sensors are either too close or too far away from the dies' test, the testing sensors will not have the correct sensitivity and erroneous test results will be obtained. The referenced voltage will represent the height of wafer 22 plus the height of the feeler gauge. Comparator 14 will be used as a null sensing device i.e., is wafer 22 above or below the reference height. If wafer 22 is above the reference height, comparator 22 will have an output that will be transmitted on the high voltage output line of comparator 14. The aforementioned output would represent the distance that wafer 22 is above the reference height. In the event wafer 22 is below the reference height, comparator 14 will have an output on its low voltage line. This output would represent the distance that wafer 22 is below the reference height. If wafer 22 is at the reference height (the correct height for the performance of electrical test), then the input voltage to comparator 14 will be the same as the reference voltage and comparator 14 will have no output.

When probe 11 indicates that wafer 22 is above the reference height, comparator 14 will transmit a pulse on its high voltage line to one of the inputs of AND gate 16 and one of the inputs of exclusive OR gate 15. Gate 15 will be enabled, which will cause gate 16 to be enabled. Gate 16 will notify computer 18 that the height of wafer 22 is too high. Computer 18 will tell Z drive 19 to reduce the height of chuck 21 and wafer 22. When probe 11 indicates that wafer 22 is below the reference height, comparator 14 will transmit a pulse on its low voltage line to one of the inputs of AND gate 17 and one of the inputs of the exclusive OR gate 15. Gate 15 will be enabled, which will cause gate 17 to be enabled. Gate 17 will notify computer 18 that the height of wafer 22 is too low. Computer 18 will tell Z drive 19 to increase the height of chuck 21 and wafer 22. The foregoing process will continue until a null is reached and wafer 22 is at the reference height.

The surface of wafer 22 may be profiled using the above circuit in conjunction with X, Y position driver 20. The surface of wafer 22 is profiled so that the contour of wafer 22 may be known and electrical test sensors 25 automatically driven to the correct height and test pad location of individual dies on wafer 22. This is done to permit the automatic testing of the dies on wafer 22 and the determining of the edges of wafer 22. Hence, the height and location of the test pads on each individual die would not have to be measured or test performed on incomplete dies. The program contained within computer 18 to perform the foregoing is

```
SUBPROGRAM profiler,
FUNCTION zprof_height :INTEGER;
VAR
zz :INTEGER;
x, y, zx, zy, zx y :REAL;
BEGIN
x := xcurrent − xcenter ; y := ycurrent − ycenter;
IF x > 0.0
THEN zx := (z[1] + z[4]) / 2.0 { first or fourth quad }
ELSE zx := (z[2] + z[3]) / 2.0;{ second or third quad }
IF y > 0.0
THEN zy := (z[3] + z[4]) / 2.0 { third or fourth quad }
ELSE zy := (z[1] + z[2]) / 2.0;{ first or second quad }
zxy := (zx * ABS(x) + zy * ABS(y)) / (radius*0.8/SQRT(2.0));
zz := round ( zxy ) + zz0;
zprof_height := zz;
END;
PROCEDURE z_up_profiled;
VAR
z :INTEGER;
BEGIN
z := zprof_height + zdifference + r_parm.z_overtravel;
movez ( z );
END;
PROCEDURE z_down_profiled;
VAR
z :INTEGER;
BEGIN
z := zpos − r_parm.z_cvertravel − r_parm.z_clearance;
movez ( z )
END;
PROCEDURE profile ;
CONST
diam_offset = 200;
scan_number = 2120;
VAR
ix, iy, i, q :INTEGER;
pt2rxy, pt3rxy, sc_rxy, xdiam,
xC, yC :XINTEGER;
x,y :ARRAY [1..4] OF XINTEGER;
mxy, nxy, rxy :REAL;
newdiameter :REAL;
PROCEDURE measure_z ( x, y :XINTEGER; VAR z
:INTEGER );
BEGIN
movez ( zsafe );
movexy ( x, y );
xcurrent := x; ycurrent := y;
{ . . . start jogging if below ref height }
IF hsense < 0
THEN BEGIN
REPEAT
jogzup;
UNTIL hsense > = 0 ;
END;
z := zpos;
END;
PROCEDURE tincecce ( VAR xe, ye :XINTEGER; dx, dy
:INTEGER );
CONST
one_step = 5;
VAR
l, ze :INTEGER;
x, y :XINTEGER;
BEGIN
xcurrent := x0 + sc_rxy * dx;
ycurrent := y0 + sc_rxy * dy;
movexy ( xcurrent, ycurrent );
WHILE hsense < 0 DC
jogzup;
ze := 4 * r_parm.z_scale; {continue 4 mils higher}
FOR i := 1 TO ze DO jogzup;
x := xcurrent + pt2rxy * dx;
```

```
-continued
y := ycurrent + pt2rxy * dy;
move ( x, y );
xcurrent := x; ycurrent := y;
{ ... wait until chuck is below reference height ... }
REPEAT UNTIL hsense < 0 ;
stop__xy;
read__xy(xe,ye);
{ ... jog back and find exact edge ... }
REPEAT
xe := xe − one__step * dx;
ye := ye − one__step * dy;
move ( xe, ye, );
xcurrent := xe; ycurrent := ye;
{ ... wait until edge sensor changes to plus ... }
UNTIL hsense >= 0;
movez ( zsafe );
END;
BEGIN
pt rxy := rcure ( radius * 0.3 / SORT(2.0) );
ptZrxy := pt8rxy DIV Z;
sc__rxy := rol ( radius / SQRT(2.0) ) - tar__number,
hsensor (TRL ; { turn sense air ... }
movez ( z200 ),
movexy ( xsen, ysen );
xcurrent := xsen; ycurrent := ysen;
x0 := xsen; y0 := ysen;
zsafe := z200;
q := 4;
{ ... measure height at the wafer center ... }
measure z ( xsen, ysen, zz0 );
zsafe := zz0 − 12 * r__parm.z__scale;
FOR i := 1 TO 4 DO
BEGIN
IF (1 < q) AND (q < 4 ) THEN
ix := −1 ELSE ix := 1;
IF q < 3 THEN
measure__z(xsertix*pt8rxy,ysertiy*pt8rxy,z[q]);
z[q] := z[q] − zz0;
IF i <> 2 THEN
findedge(x[i],y[i],ix,iy);
IF i = 3 THEN
BEGIN
x0 := (x[3] + x[1]) DIV 2;
y0 := (y[3] + y[1]) DIV 2
END;
q := q − 1;
END;
mxy := (abs(x[1]− x[3]) + abs(y[1] − y[3])) / 4.0;
nxy := (abs(x[4] − x0) + abs(y0 − y[4])) / 2.0;
rxy := (((mxy * mxy) / nxy) + nxy) / 2.0;
xdiam := round(rxy);
xron__con := [4] + xdiam;
xcenter := xcen − xser + xnor__con;
ynon__con := y[4] − xdiam;
ycenter := ycen − ysen + ynor__con;
xdiam := xdiam * 2 + diam__offset;
rsq := xdiam * xdiam DIV 2;
newdiameter := xdiam;
newdiameter := newdiameter * SQRT(2.0);
movez ( z200 );
hsensor ( FALSE );
END
```

Thus, wafer 22 is profiled by having probe 11 measure heights at several points on wafer 22 so that computer 18 may make a surface approximation of wafer 22.

Typically, wafer 22 is profiled by the operator of this invention by placing the nominal center of wafer 22 point ($X_1 Y_1$) under probe 11. The real center of wafer 22 is determined by having driver 20 move chuck 21 and wafer 22 in X and Y until probe 11 goes off the edge of wafer 22. During the foregoing movement, the height measurement will be overdriven so that sensor 13 will always read high. Thus, when a low reading is sensed by sensor 13 and comparator 14, probe 11 may be over the edge of wafer 22. When probe 11 goes off the edge of wafer 22, computer 18 will note the X, Y position detected by detector 20 just before probe 11 went off the edge. For purposes of discussion we will call the aforementioned edge point ($X_2 Y_2$). Now driver 20 will cause chuck 21 to move wafer 22 under probe 11 in such a manner that the previous line $X_1 Y_1$; $X_2 Y_2$ will be retraced and the above-mentioned line continued until probe 11 senses another edge of wafer 22. This edge of wafer 22 will be called point ($X_4 Y_4$). When line $X_2 Y_2$, $X_3 Y_3$ is bisected and a perpendicular line $X_4 Y_4$, $X_5 Y_5$ drawn through line $X_2 Y_2$, $X_3 Y_3$ the perpendicular line will be the diameter of wafer 22. Points ($X_4 Y_4$) and ($X_5$)($Y_5$) will be the end points of the aforementioned perpendicular line on the circumference of wafer 22. Computer 18 will determine the mid-point of line $X_4 Y_4$, $X_5 Y_5$ which will be the center of wafer 22 point $X_6 Y_6$. Once computer 18 determines the center of wafer 22, it will be able to calculate the location of all of the test pads on each individual die on wafer 22 as well as the location of incomplete dies. The reason for the above is that the sizes of the dies are known by the computer and are unique for a particular type of wafer. In order to adequately map the surface of wafer 22 and determine an approximation of the surface of wafer 22, probe 11 will measure the height of three or four points in each quadrant of wafer 22. The three or four points measured in each quadrant will define a plane. Computer 18 will know that in any plane the Z height measured by probe 11 will be a function of X and Y. Computer 18 will note the X, Y and Z measured readings and compute a Z surface profile (assuming that wafer 22 is planar within a quadrant) wherein Z is a function of X and Y. Thus, whenever electrical sensors probes 25 test the pads of a die computer 18 will direct driver 20 to move chuck 21 to the test pads of that die and computer 18 will direct Z drive 19 to move chuck 21 to the proper height for performing that test. Hence, the apparatus of this invention will be able to automatically step from die to die on wafer 22 without individually sensing the location and height of each die's test pads.

Computer 18 knows the X Y location of each die on wafer 22 thus it also knows which die is being tested at a given time. Hence, the results of the test for each die may be stored in the memory of computer 18 so that the test results of the dies that failed particular tests may be compared with dies on other wafers at the same location to check if something is wrong with the wafer manufacturing process. It is no longer necessary to mark defective dies with a dab of paint and risk damaging other dies, since computer 18 knows which dies are defective, it may send a map of these dies to a die attach machine (not shown) to pick up the good dies in the dicing process.

The above specification describes a new and improved wafer height measuring system that may be used to test dies. It is realized that the above description may indicate to those skilled in the arts additional ways in which the principals of this invention may be used without departing from its spirit. It is, therefore, intended that this invention be limited only by the scope of the appended claims.

What is claimed is:

1. A system for determining the height of specific points on a wafer, and the approximate location of a plurality of dies, that comprise said wafer said system comprising:

(a) a chuck for holding a wafer containing a plurality of dies of various positions;

(b) a probe that senses differences in air pressure between specific points on the wafer and said probe;
(c) a comparator coupled to the output of said probe for comparing the height sensed by said probe to a reference level stored in said comparing means and determining whether or not said probe is at, above, or below said reference level;
(d) a computer coupled to the output of said comparator for determining the relative orientation of said probe and location of said dies; and
(e) means whose input is coupled to the output of said computer and whose output is coupled to the input of said chuck for moving said chuck to specified X, Y, Z locations so that said probe may sense different points on said wafer, and said computer will determine a mathematical approximation of the surface configuration of said wafer wherein the location of incomplete dies and/or one or more edges of said wafer may be determined by over driving said probe as said wafer is moved relative to said probe so that the edges of said wafer will be determined the moment said comparator indicates that said probe is below the reference level and said computer determines if there is a complete or incomplete die at that edge location.

2. The system claimed in claim 1 wherein said determining means comprises:
(a) an exclusive OR gate whose inputs are coupled to the high and low outputs of said comparator;
(b) a first AND gate having one input coupled to the output of said OR gate and a second input coupled to the high output of said comparator;
(c) a second AND gate having one input coupled to the output of said OR gate and second input coupled to the low output of said comparator; and
(d) a computer whose inputs are coupled to the output of said first and second AND gates.

3. A system for profiling the surface of a wafer containing a plurality of completed and/or incompleted dies so that one or more electronic and/or electrical test sensors will be able to automatically step from completed die to completed die, said system comprising:
(a) means for holding a wafer at various positions, said wafer contains a plurality of completed or incompleted dies, which have one or more test pads;
(b) a probe that senses differences in air pressure between a point on said wafer and said probe;
(c) comparing means coupled to the output of said probe for comparing the height sensed by said probe to a reference level stored in sid comparing means and determining whether or not said probe is at, above or below said reference level;
(d) computing means coupled to the output of said comparing means for computing the relative orientation of said probe and the height of specific points on said wafer as said probe, probes the surface of said wafer so that said computer means will compute a mathematical approximation of the surface configuration of said wafer and know the location of incomplete dies and the location of the test pads of each die;
(e) means whose input is coupled to the output of said computing means and whose output is coupled to the input of said holding means for moving said holding means to specified X, Y, Z locations so that said probe may sense different points on said wafer; and
(f) one or more electronic and/or electrical test sensors that are positioned in such a manner that the test pads of each completed die will be individually sensed by said sensors when said computing means directs said moving means to move a specific completed die in contact with said sensors.

4. The system claimed in claim 3 wherein said holding means is a chuck.

5. The system claimed in claim 3 wherein said comparing means is a comparator that has a high output which indicates that said probe is above the reference level and a low output which indicates that said probe is below the reference level.

6. The system claimed in claim 4 wherein said computing means comprises:
(a) an exclusive OR gate whose inputs are coupled to the high and low outputs of said comparator;
(b) a first AND gate having one input coupled to the output of said OR gate and a second input coupled to the high output of said comparator;
(c) a second AND gate having one input coupled to the output of said OR gate and a second input coupled to the low output of said comparator; and
(d) a computer whose inputs are coupled to the output of said first and second AND gates.

7. The system claimed in claim 3 wherein one or more edges of said wafer may be determined by over driving said prober as said wafer is moved relative to said probe so that the edges of said wafer will be determined the moment said comparing means indicates that said probe is below the reference level.

8. The system claimed in claim 3 wherein the output of said sensor is coupled to said computing means so that said computing means may store the test results of each die.

9. The system claimed in claim 3 wherein said computing means is coupled to an output device that displays the test results of each die.

10. The system claimed in claim 3 wherein said computing means is coupled to a dicing unit so that said dicing unit will know the location of the dies that failed the tests performed by said sensors.

11. A method for profiling the surface of a wafer containing a plurality of completed and/or incompleted dies having test pads in which electrical and/or electronic tests will be automatically performed on each test pad of said completed dies, said method includes the steps of:
(a) probing a few specific points on a wafers surface with an air probe;
(b) comparing the heights sensed by said probe to a reference level;
(c) computing a X, Y, Z profile of the surface of the wafer using the height sensed by said probe to determine an approximation of the surface characteristics of the wafer;
(d) determine the approximate location of incomplete dies and the approximate location of the test pads of each completed die using said X, Y, Z profile; and
(e) performing electrical and/or electronic tests on the test pads of the completed dies.

* * * * *